Patented Jan. 13, 1953

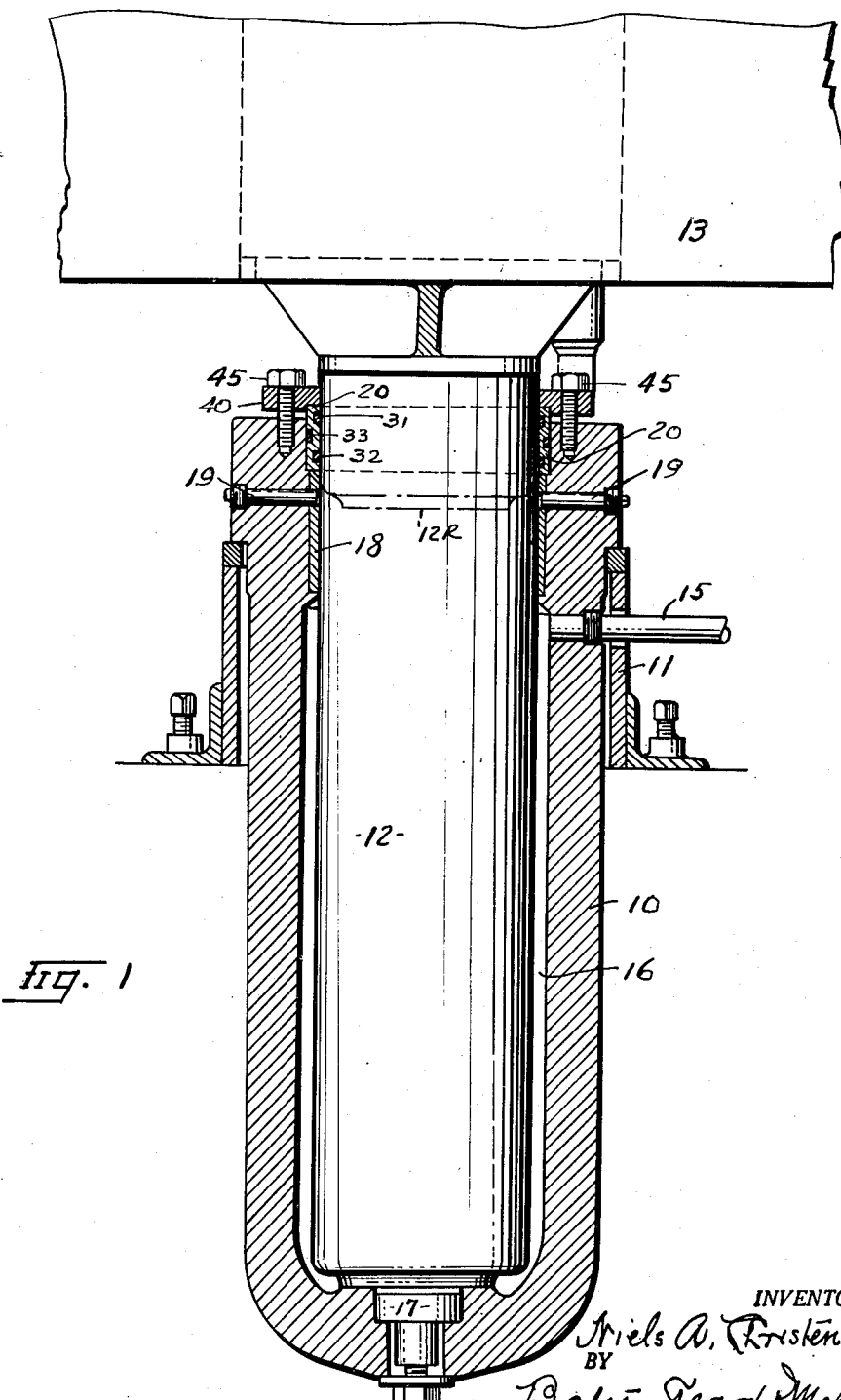

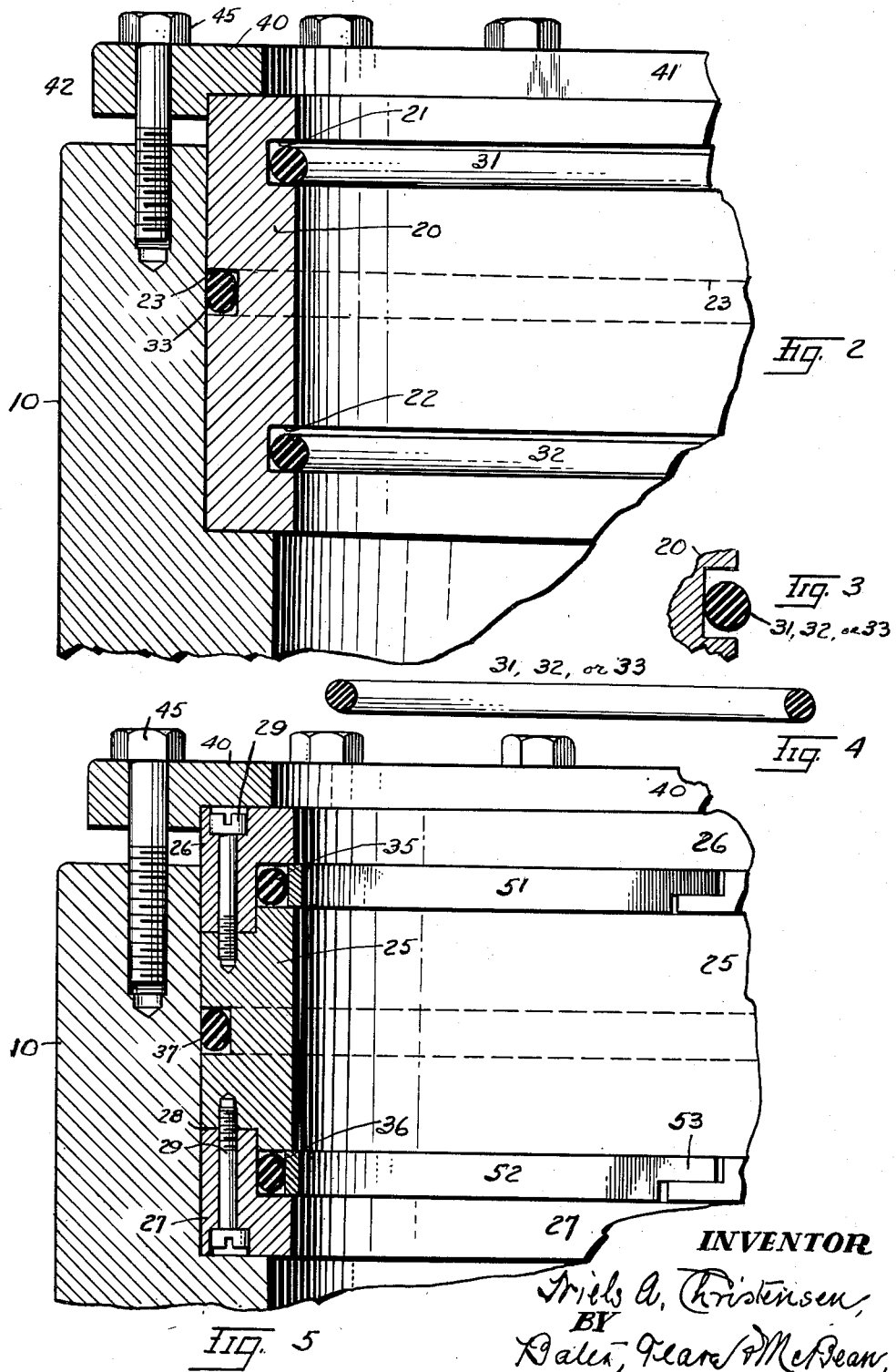

2,625,413

UNITED STATES PATENT OFFICE 2,625,413

SEAL FOR HYDRAULIC RAMS

Niels A. Christensen, South Euclid, Ohio

Application March 4, 1948, Serial No. 12,982

1 Claim. (Cl. 286—26)

In many operations where a heavy load is lifted by a ram movable in a cylinder by means of a pressure liquid admitted thereto, the pressure is frequently very great, with the result that much difficulty has been encountered in maintaining a proper packing between the cylinder and the ram. Leakage of pressure oil past the packing has frequently resulted not only in a diminution in efficiency but in a very considerable oil.

It is the object of the present invention to overcome this difficulty by providing a sealing means between the cylinder and ram which while allowing ready operation of the ram will prevent material leakage past the seal. In accomplishing this I avail myself of elastic O-rings snugly surrounding the ram and loosely occupying grooves carried by the cylinder wall, so that some longitudinal rolling movement is allowed to the ring to maintain its pliability.

A feature of my invention comprises an annular sleeve removably mounted in the cylinder and having the groove carrying the O-ring, so that by removal of the sleeve the O-ring may be very conveniently inspected and replaced if desired.

Another feature of my invention comprises means for maintaining a fluid-tight connection between the annular sleeve and the cylinder. This I prefer to accomplish by means of another O-ring seated in an outwardly facing groove in the annular sleeve and coacting with the cylinder body to maintain a leakage-tight connection between them.

Other features of my invention, which may be employed if desired, comprise making the annular sleeve of parts separable at the groove to enable the ready removal of O-ring and replacement without distortion. Likewise, the feature of armoring such O-ring by a cylindrical split metallic ring which forms the actual contact with the ram, and reduces wear on the O-ring.

All of the above features, and others contributing to the efficiency of the entire mechanism, are hereinafter described in detail in connection with the accompanying drawings, which illustrate preferred embodiments.

In the drawings, Fig. 1 is a vertical central section of an illustrative hydraulic ram equipped with my sealing rings being shown somewhat conventionally; Fig. 2 is an enlarged view (somewhat differently proportioned) of the upper portion of the cylinder showing the annular sleeve and the inwardly and outwardly acting sealing rings seated therein; Fig. 3 is a detail indicating any one of the sealing rings in its groove; Fig. 4 is a diametric section in the sealing ring itself; Fig. 5 is a view similar to Fig. 2, but showing a modification of the annular sleeve carrying the sealing rings.

As shown in Fig. 1, 10 designates a cylinder for the ram, supported by a suitable support 11 surrounding the cylinder; Fig. 12 designates the ram itself operating in the cylinder and shown in its lowermost position, the uppermost position being indicated by the broken lines 12R. The ram carries any suitable platform to support the load. 15 designates an intake conduit whereby liquid, preferably oil, under pressure may be forced into the annular space 16 between the cylinder and ram. 17 indicates a suitable draining plug at the bottom of the cylinder which in operation is closed. Such a cylinder is usually provided with an internal bushing 18 near its upper end to provide a good sliding bearing for the ram and it is customary to secure such a bushing by threaded plugs 19 mounted in the cylinder and entering the bushing.

To provide a ram and cylinder of the general construction as above described with effective sealing means adjacent the upper end of the cylinder, I mount in an annular recess in the cylinder wall an annular sleeve, such as the sleeve 20 in Figs. 1 and 2. This sleeve is concentrically cylindrical on its inner and outer surface and has grooves in such surface shown as the two grooves 21, 22 on the inner surface and the single groove 23 on the outer surface. In each of these grooves is mounted an elastic toroidal ring, the inwardly facing rings engaging the ram being designated 31 and 32 in Figs. 1 and 2 and the outer ring 33.

Each of the toroidal rings is longitudinally loose in the groove it occupies. The two rings 31 and 32 make a tight connection between the ram and the annular sleeve 20, and the ring 33 makes a tight connection between the annular sleeve and the body cylinder.

The sleeve is held in place by suitable means, as for instance, the annular metallic plate 40 resting on the top of the sleeve and clamped to the cylinder wall. This plate has a central opening 41 somewhat larger than the ram and is preferably thickened in its rim portion as at 42 providing a rabbet engaging the annular sleeve and definitely locating the clamping plate 40. This clamping plate is shown as secured to the cylinder by cap screws 45 passing through the clamping plate and threaded in the upper end of the cylinder wall.

With the construction described, the annular sleeve 20 is firmly clamped in place against a rabbet shoulder provided in such wall. The toroidal ring 33 makes a fluid-tight connection between the annular sleeve and the cylinder, so that when in place the sleeve operates as a unitary part of the stationary cylinder construction. The toroidal rings 31 and 32 and the inwardly facing grooves on the annular sleeve coact with the ram to make a tight engagement with it as the ram moves in the cylinder.

To replace either the inner or outer toroidal rings it is only necessary to remove the ram and then remove the cap screw 45 and then remove the annular sleeve 20 from the upper end of the cylinder. This enables all of the toroidal rings to be readily inspected and replaced in the sleeve, and then the sleeve with its rings returned to the position indicated in Figs. 1 and 2. In the replacement of the rings in the embodiment of Figs. 1 and 2, the inner rings are sprung inwardly out of their grooves and the outward ring outwardly and thence pass freely from the sleeve and the fresh rings are inserted by reverse operation.

To avoid wear on the rings coacting with the ram, I may utilize the amplification of my invention illustrated in Fig. 5. In this embodiment instead of the inner toroidal rings engaging directly with the ram, I provide split metallic rings 51 and 52 which on their inner surface engage the ram and on their outer surface engage the toroidal rings designated 35 and 36 occupying the inwardly facing grooves in the annular sleeve.

To enable the ready placement of the metallic rings 51 and 52, as well as the yielding rings 33 and 34, I may take the annular sleeve of three parts separable from each other, namely, an intermediate annular part 25, an upper annular part 26 and a lower annular part 27. The part 25, which is shown as carrying the external toroidal ring 37, is provided with a rabbeted recess 28 on the outer portion of its upper and under surfaces. The upper ring 26, L-shaped in cross section, has a downwardly extending flange portion which seats in the rabbeted recess 28 in the upper end of the member 25. Similarly the member 27 is L-shaped in cross section and has a flange portion seating in the rabbet recess 28 of the lower face of the intermediate member.

The ring members 27 and 28 are rigidly held to the member 25 by filister headed screws 29 extending through the rings 27 and 28 and threaded in the intermediate ring 25.

When the end rings 26 and 27 are in place, as shown in Fig. 5, there is provided an inwardly facing groove between their rabbets and the adjacent end of the intermediate member 25, and these grooves are occupied by the respective toroidal ring 35 or 36 and the internal armor ring 51 or 52.

The composite annular sleeve above described may have external dimensions the same as the unitary sleeve 20 of Fig. 2 and be held in place by exactly the same means, for example, the clamping plate 40 and the clamping screws 45 passing through the clamping plate and threaded into the cylinder wall.

When the composite sleeve is in place the toroidal ring 37 maintains a fluid-tight connection between the sleeve and the cylinder body and the two rings 35 and 36 maintain a fluid-tight connection between the armor rings 51 or 52 and the annular sleeve.

The normal stress condition of the rings 51 and 52 when free from the ram is substantially, as indicated in Fig. 5; that is to say they project outwardly into the grooves of the annular sleeve and inwardly into the cylinder bore for the ram. Hence, when the ram is put in place it spreads the metallic rings, which are somewhat resilient, outwardly into the respective grooves and their reaction maintains a substantially fluid-tight though sliding connection between the inner surface of the metallic rings and the outer surface of the ram.

It will be noticed that the overlapping ends of the split rings 51 or 52 engage each other along the central radial plane indicated at 53 which registers with the crest of the O-ring 35 or 36 so that there is no leakage past the ring through the longitudinal expansion spaces therein.

The construction of Fig. 5 reduces the wear on the inwardly acting toroidal rings as they are protected from actual rubbing by the traveling ram. The provision for readily releasing the ram engaging rings 51 and 52 enables their ready replacement whenever the wear upon them becomes excessive. To effect this replacement the cap screws 45 are removed and the clamping plate thus releases the composite ring, which may then be removed from the cylinder. After removal, the screws 29 may be taken out and the end rings 26 and 27 of the composite ring removed, thus freeing at once the ram engaging split rings 51 and 52 and also the yielding toroidal rings behind the ram rings. New parts may thus be readily replaced endwise against the sleeve member 25 and the end portion 26 and 27 of the sleeve replaced. Thereafter the whole composite sleeve with its inner and outer rings is inserted in the cylinder and clamped by the plate 40 and clamp screws 45.

It is obvious that the composite sleeve construction of Fig. 5 may be employed without the metallic armor rings and with the inner toroidal rings acting directly against the ram, as shown in Fig. 2, if it is found desirable to avoid the temporary distortion of the toroidal rings in springing them into the fixed grooves of Fig. 2.

I claim:

The combination of a cylinder having an annularly recessed end portion, a composite sleeve mounted therein, an annular clamping plate resting against the free end of the sleeve, means for forcing the clamping plate toward the cylinder to hold the annular sleeve firmly against the shoulder provided by the far end of the recess, said composite sleeve comprising an intermediate member having outwardly facing rabbets at its opposite ends spaced from the inner periphery and two L-shaped end members each having one leg respectively interlocking a different rabbeted space of the intermediate member and each having another leg extending toward the inner periphery, said one leg of each end member being longer than the axial dimension of the corresponding rabbet of the intermediate member, screws passing through the end members and threaded into the intermediate member for rigidly interlocking the three parts together leaving two inwardly facing grooves between the intermediate member and the legs of said end members, toroidal rings occupying said grooves each of less cross-sectional diameter than the axial length of the groove it occupies, and a reciprocable ram within the sleeve with which the said toroidal rings cooperate.

NIELS A. CHRISTENSEN.

REFERENCES CITED

The following references are of record in the file of this patent:

UNITED STATES PATENTS

| Number | Name | Date |
|---|---|---|
| 1,498,104 | McCorkle | June 17, 1924 |
| 1,576,341 | Love | Mar. 9, 1926 |
| 1,780,764 | Noble | Nov. 4, 1930 |
| 2,404,547 | Strid | July 23, 1946 |
| 2,410,808 | Christensen | Nov. 12, 1946 |
| 2,509,672 | Christensen | May 30, 1950 |

FOREIGN PATENTS

| Number | Country | Date |
|---|---|---|
| 224,101 | Great Britain | of 1924 |
| 811,703 | France | of 1937 |